(12) United States Patent
Lo

(10) Patent No.: US 6,353,965 B1
(45) Date of Patent: Mar. 12, 2002

(54) GUIDING SHEATH ASSEMBLY FOR A HINGE OF AN EYEGLASS FRAME

(75) Inventor: Kun-Yuan Lo, Shinjuang (TW)

(73) Assignee: Ching Lan Co., Ltd. (TW)

( * ) Notice: Subject to any disclaimer, the term of this patent is extended or adjusted under 35 U.S.C. 154(b) by 0 days.

(21) Appl. No.: 09/635,761

(22) Filed: Aug. 11, 2000

(30) Foreign Application Priority Data

Aug. 23, 1999 (TW) .......................................... 88214340
Apr. 11, 2000 (TW) .......................................... 89205735

(51) Int. Cl.[7] .................................................. G02C 5/22
(52) U.S. Cl. ............................ 16/228; 16/327; 351/113; 351/153
(58) Field of Search ......................... 16/228, 273, 327; 351/113, 114, 111, 121, 153

(56) References Cited

U.S. PATENT DOCUMENTS

| | | | | |
|---|---|---|---|---|
| 3,633,243 A | * | 1/1972 | Dietrich et al. ............... | 16/228 |
| 4,461,548 A | * | 7/1984 | Drlik ............................ | 351/153 |
| 4,534,628 A | * | 8/1985 | Morel .......................... | 351/121 |
| 4,747,183 A | * | 5/1988 | Drlik ............................ | 351/113 |
| 5,953,791 A | * | 9/1999 | Da Forno ..................... | 16/228 |
| 6,152,562 A | * | 11/2000 | Montalban .................... | 16/228 |

FOREIGN PATENT DOCUMENTS

| | | | | |
|---|---|---|---|---|
| GB | 2266783 A | * | 11/1993 | ................... 16/228 |
| JP | 0133021 | * | 5/1989 | ................... 16/228 |

* cited by examiner

Primary Examiner—Chuck Y. Mah
(74) Attorney, Agent, or Firm—Bacon & Thomas, PLLC

(57) ABSTRACT

The present invention is about a guiding sheath with spacer for the hinge of eye-glasses, such that the sheath provides low frictional spacer to titanium alloy hinges. Sheath with spacer made from bronze or synthetic rubber with frictional coefficient less than that of titanium alloy can effectively lower the wear and tear at the hinge due to friction, enhance the smooth folding of the hinge, and thus extend the durability of the hinge. In addition to providing spacer, the present invention also provides positioning latch to the active core of the hinge and lateral support to the shaft during displacement, effectively enhances the stability of the shaft during displacement.

3 Claims, 9 Drawing Sheets

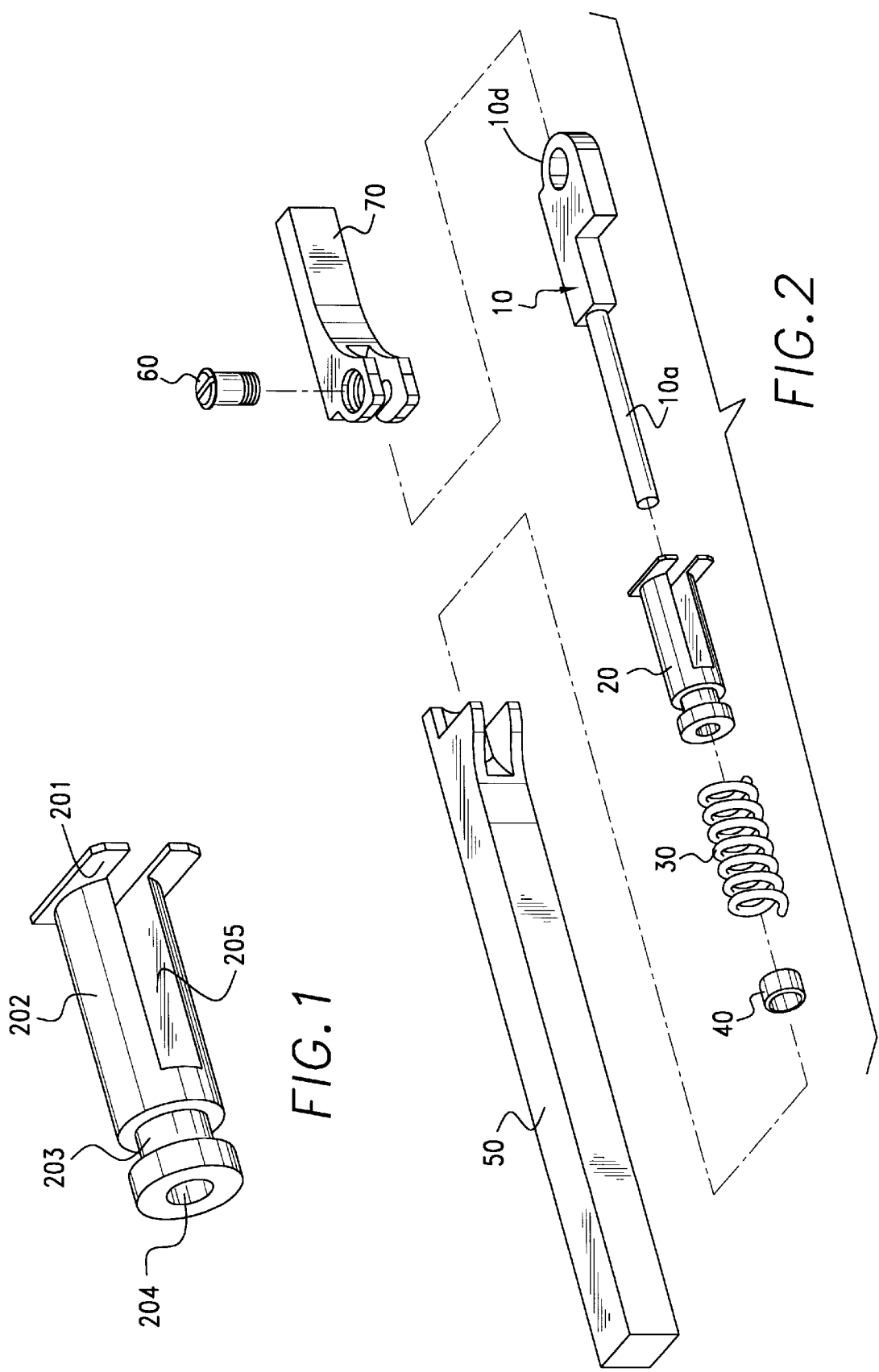

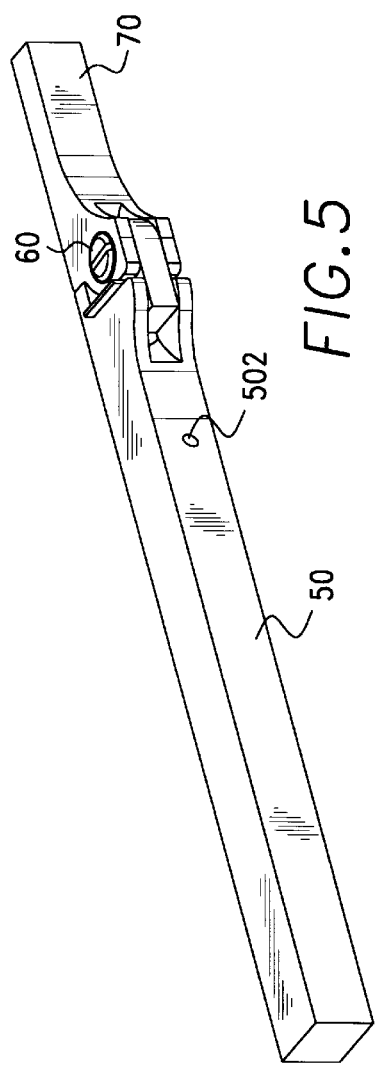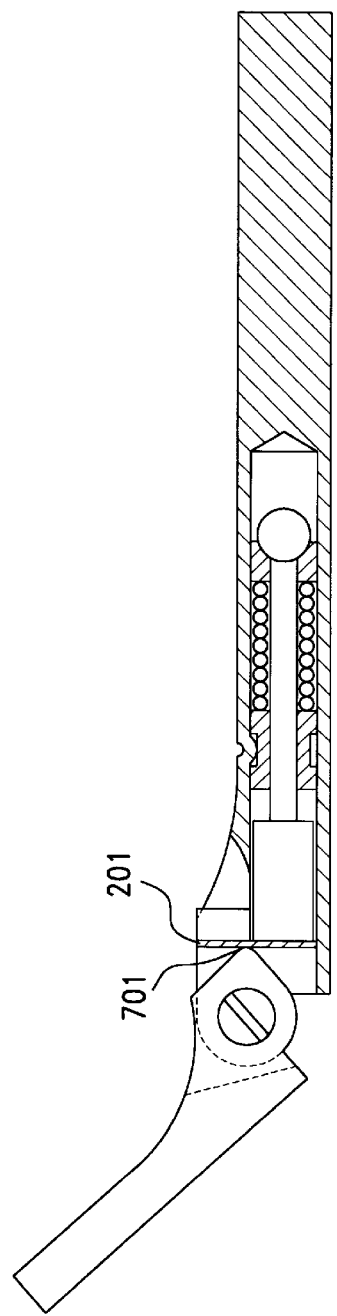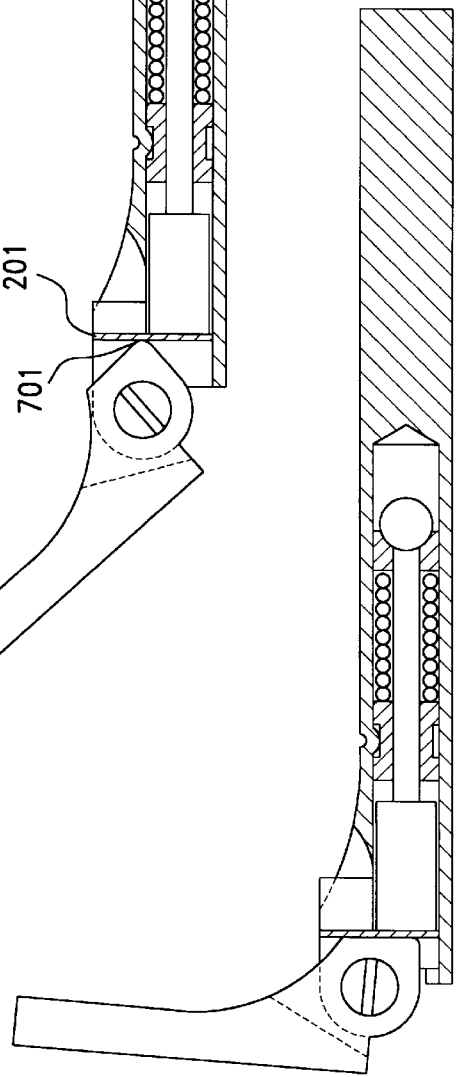

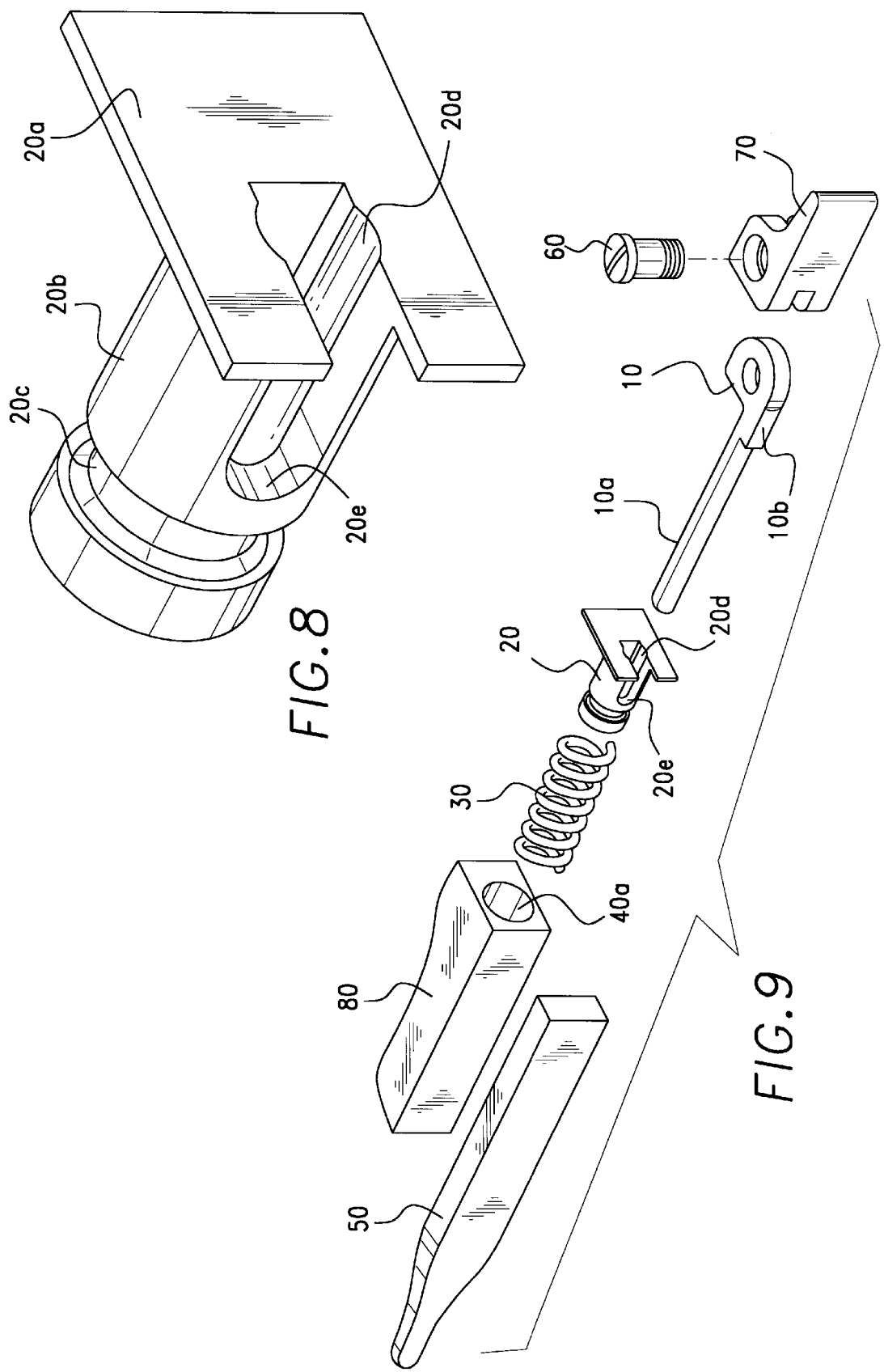

ated by the spring...

GUIDING SHEATH ASSEMBLY FOR A HINGE OF AN EYEGLASS FRAME

BACKGROUND OF THE INVENTION

1. Field of the Invention

The present invention relates to a guiding sheath for the hinges of eye-glasses, especially to a guiding sheath with spacer that reduces wear and tear of the titanium alloy hinges and thus prolongs product durability, 2. Description of the Related Art In the modern era, people rely heavily on their eyes for receiving information as well as for engaging in recreational activities. Eye-glasses thus become indispensable to may people. As a pair of eye-glasses is supported by the nose and ears, if too heavy, it will strain the nose and ears. The titanium alloy, used in the modern spacecraft, has been employed to make strong but light-weighted eye-glass frames. However, titanium alloy tends to wear down due to rough friction. The constant sliding at the hinges creates rough fiction that hinders movement and wears down the material. The present invention aims to address and overcome this drawback.

SUMMARY OF THE INVENTION

Because the problem of wear and tear at the hinges of eye-glasses has not been effectively addressed that will shorten hinge's durability by the conventional art, the present invention designs a guiding sheath made of smooth material having low coefficient of friction that protects the hinges again rough sliding and thus prolongs hinge's durability.

BRIEF DESCRIPTION OF THE DRAWINGS

The many strengths and characteristics of the present invention may be further elaborated by the use of following figures:

FIG. 1: A 3D view of the first embodiment of the present invention

FIG. 2: A 3D view of the components of the hinge of the first embodiment.

FIG. 5: A 3D view of the complete assembly of the hinge of the first embodiment.

FIG. 6: A sectional view of the hinge when maximum force is exerted on the hinge spring of the first embodiment.

FIG. 7: A sectional view of the main hinge at 90° position in the first embodiment.

FIG. 8: A 3D view of the second embodiment of the present invention.

FIG. 9; A 3D view of the components of the hinge of the second embodiment.

DETAILED DESCRIPTION OF THE INVENTION

Figure 3:
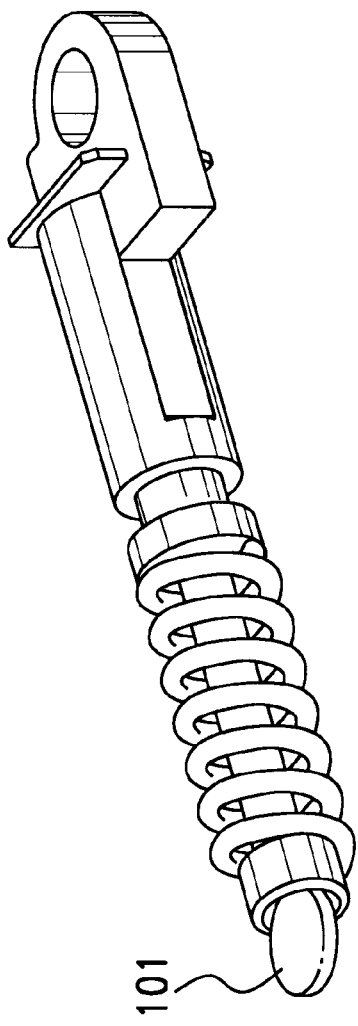
FIG. 3: Assembly of the hinge with active core of the first embodiment.

FIG. 1 illustrates the guiding sheath of the present invention, which is comprised of spacer (201), a cylinder (202), neck ditch (203), center aperture (204), and guiding slot (205).

Figure 4:
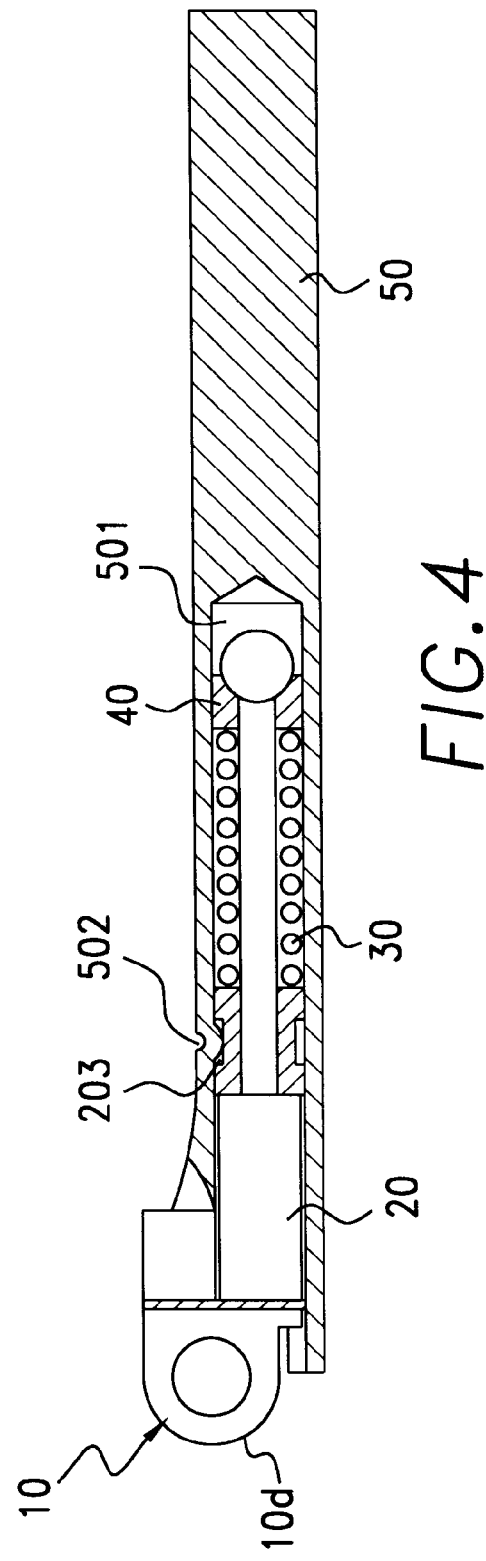
FIG. 4: Assembly of the eye-glasses temple and the hinge active core of the first embodiment.

As illustrated in FIG. 2, the active core (10) can be inserted into the guiding sheath (20), the spring (30) and washer (40) to form an active core assembly shown in FIG. 3. One apex of the active core (10) is pressed flat by a tool to serve as a stopped slice or stopper (101), which prevents loosening of the spring and other parts. The active core (10) includes a core shaft (10a) secured to a head portion (10d) of the active core (10). Inserting the active core assembly into the elongated bore (501) of the eye-glasses temple (50) as shown in FIG. 4, then stamping on the eye-glasses temple (50) at the appropriate point to form a cave point (502), which can latch onto the neck ditch (203) of the guiding sheath (20) and so fix the active core assembly at its position. Finally, assembling the main hinge (70) and the screw (60) to the eye-glasses temple having the active core assembly installed therein to form the complete hinge assembly as shown in FIG. 5.

As shown in FIG. 6, as the main hinge (70) rotates, its apex (701) impresses on the spacer (201) of the guiding sheath (20) and draws out the active core 10). As the cave point (502) latches onto the neck ditch (203) and the stopped slice (101) stops the spring (30) and the washer (40), the resulting spring (30) force creates friction at the apex (701). The spacer (201) can decrease the wear and tear of the titanium alloy material at the apex (701) and thus extends the duration of the hinge. In FIG. 7, after main hinge (70) rotates beyond its highest point, the force of the spring (30) will pull the active core (10) back to its initial position and position the main hinge (70) at a 90° angle as shown.

When the flat portion of tee active core (10) is inserted into the guiding slot (205) as shown in FIG. 1, the slot then acts to guide the motion of the shaft. Further, when the sheath is inserted into the elongated bore of the eyeglasses temple (501), the cylinder (202) of the guiding sheath (20) is restricted within the bore, end the guiding slot (205) can act as support on the lateral surfaces of the flat portion of the active core, and thus stabilizes the movement of the hinge.

As show in FIG. 8, the second embodiment of the present invention is comprised of spacer (20a), a cylinder (20b), neck ditch (20c), center aperture (20d) and guiding slot (20e).

FIG. 9 shows the required components for the spring hinge of the present invention: an active core (10), a guiding sheath (20), a spring (30), a hinge box (80), eye-glasses temple (50), screw (60) and main hinge (70).

Figure 11:
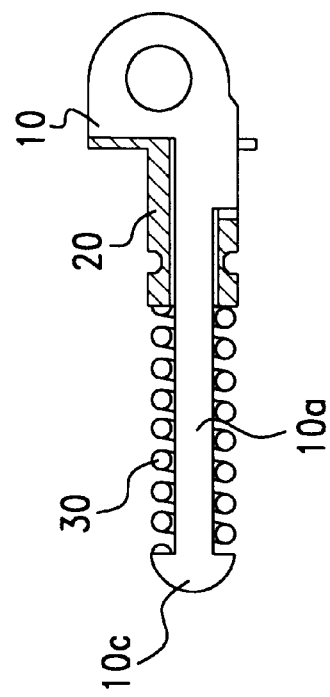
FIG. 11: A sectional view of the active core of the second embodiment.
Figure 12:
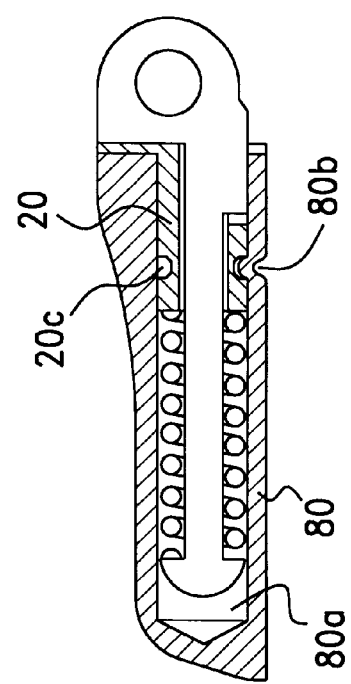
FIG. 12: A sectional view of assembly of the active core and hinge box of the second embodiment.
Figure 10:
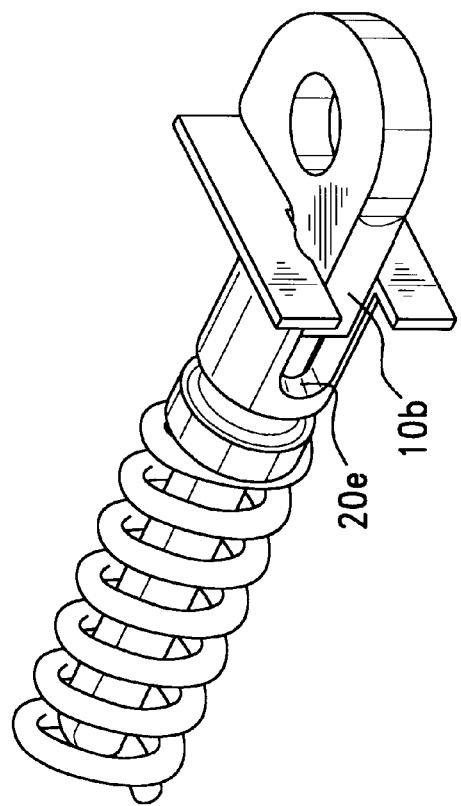
FIG. 10; Assembly of the active core and partial set of components of the second embodiment.

As shown in FIG. 9, the core shaft (10a) of the active core (10) is inserted into the center aperture (20d) of the guiding sheath (20), and the positioning back (10b) of the active core (10) is fitted inside the guiding slot (20e) of the sheath (20), and spring (30) is installed therein to form the assembly shown in FIG. 10. One apex of the core shaft (10a) is formed into a stopper (10c). FIG. 11 shows the sectional view of the assembly of the active core (10) and its components, Inserting the assembly of the active core (10) and its components into the elongated bore (80a) of the hinge box (80), then stamping on the hinge box (80) at the appropriate place to form a cave point (80b), which can latch onto the neck ditch (20c) of the guiding sheath (20) and thus fix the active core assembly at its position FIG. 12 shows a sectional view.

Figure 13:
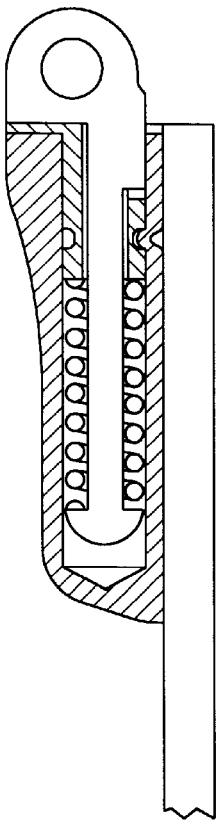
FIG. 13; A sectional view of eye-glasses temple welded with the hinge box in the second embodiment.
Figure 14:
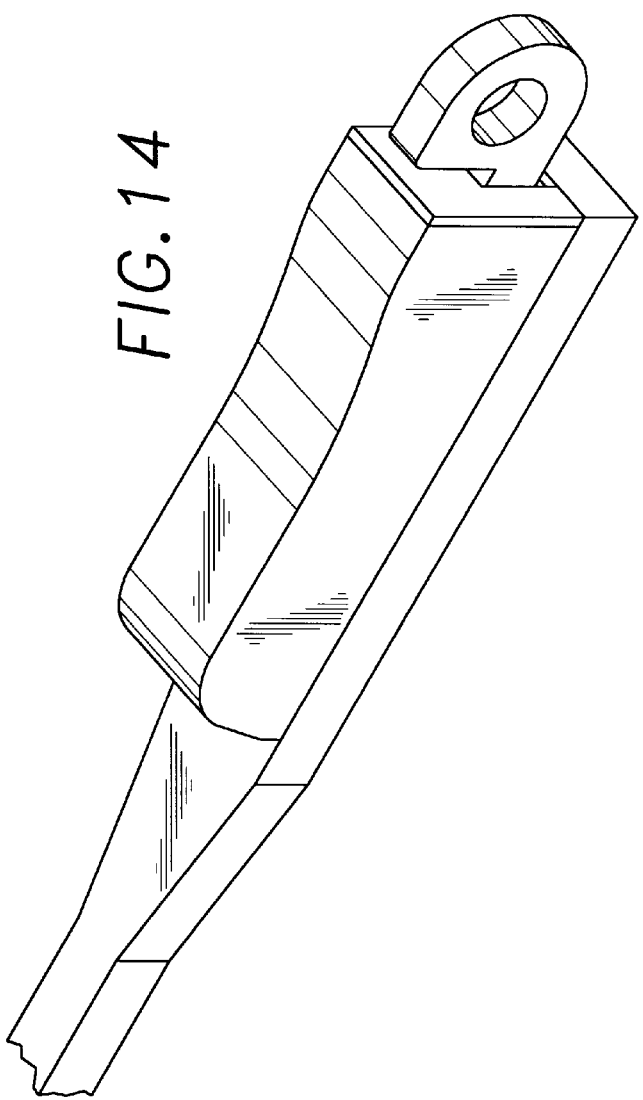
FIG. 14: A 3D view of eyeglasses temple welded with the hinge box in the second embodiment.

To prevent the guiding sheath (20) and the active core from leaning to the side or rolling inside the hinge box (80), a small portion of the eye-glasses temple (50) extends outward to impress against the sheath, and the back side of the hinge box (80) is welded onto the temple (50), as shown in the sectional view of FIG. 13 or 3D view in FIG. 14.

Figure 15:
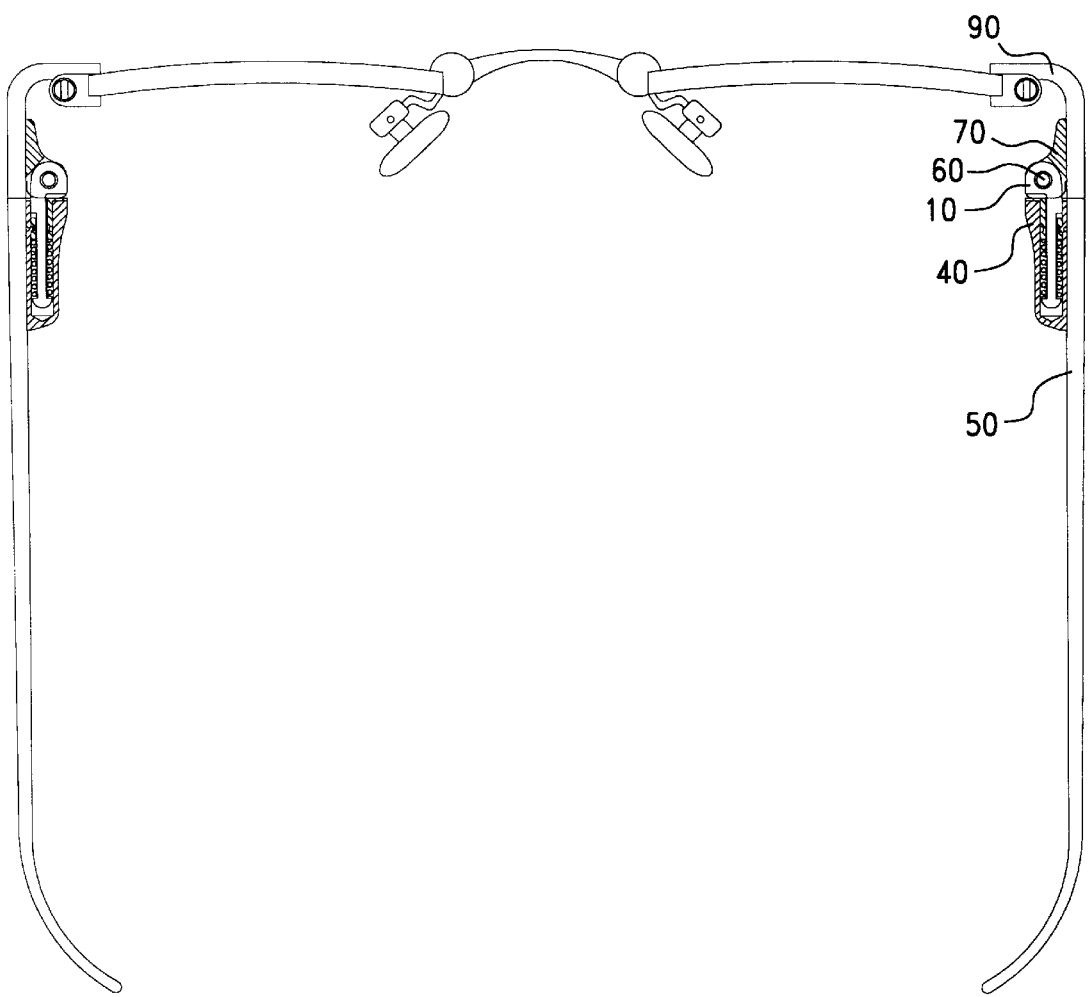
FIG. 15: A sectional view of the assembly of the hinge welded with the lens frame and temple.

Welding the main hinge (70) onto the eyeglasses frame (90) and g the active core assembly, then fastening with screw (60) to form the assembly of hinge on the eye-glasses as shown in FIG. 15.

Figure 16:
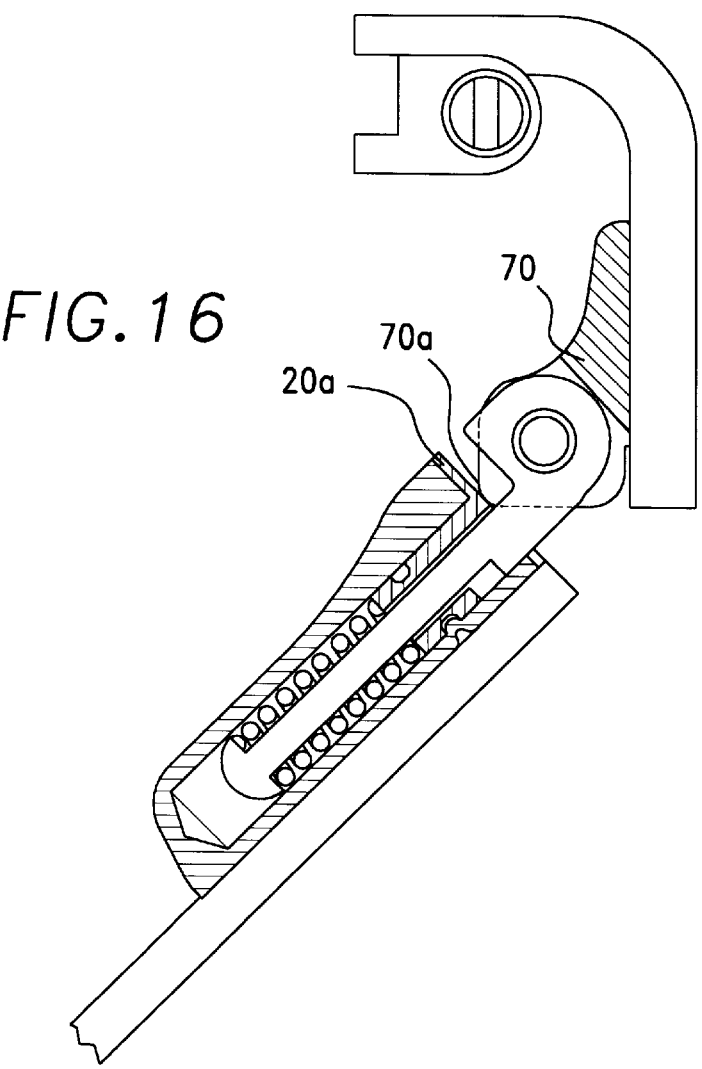
FIG. 16: A sectional view of the hinge when maximum force is exerted on the hinge spring of the second embodiment.

As shown in FIG. 16, when the temple (50) folds and the hinge box (80) rotates, the apex (70a) of the main hinge (70) made of titanium alloy slides against the spacer (20a) of the sheath. The sheath, made of white bronze or stainless steel having lower coefficient of friction, effectively reduces the wear and tear occurring at the apex (70a) and prolongs hinge's durability.

Figure 17:
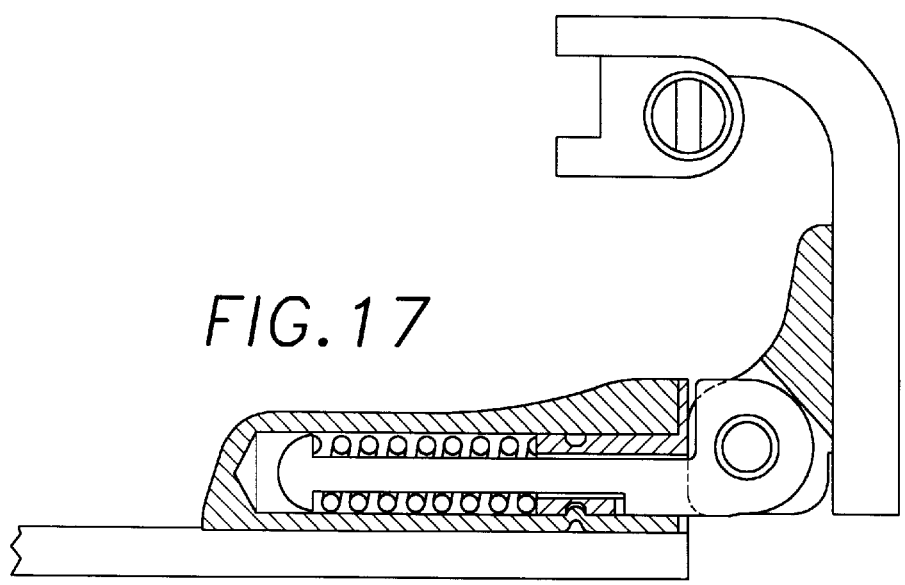
FIG. 17: A sectional view of the hinge when folded in the second embodiment.
Figure 18:
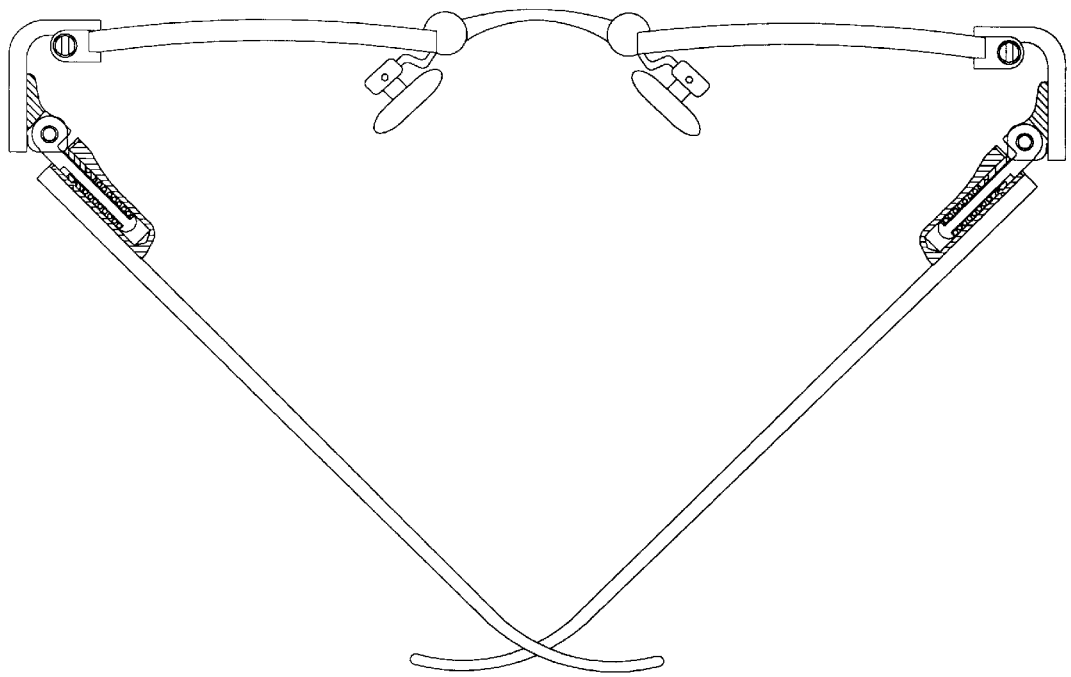
FIG. 18: A sectional view of the eye-glasses temples folded to the angle of maximum force by the spring in the second embodiment.
Figure 19:
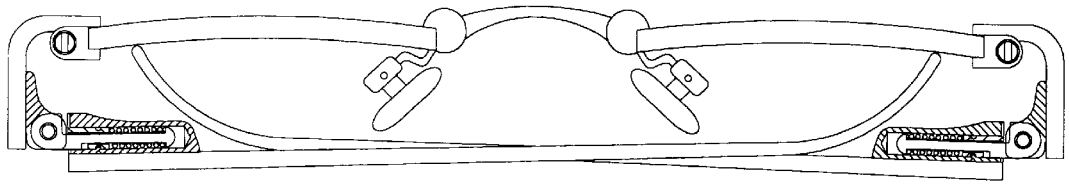
FIG. 19: A sectional view of the eye-glasses temples completed folded.

Referring to FIGS. 17, 18 and 19, respectively show in the second embodiment, the sectional views of the hinge at its folded position, the temple at the position of maximum exerted spring force and the temples completely folded.

FIG. 8 shows that in the second embodiment, the guiding sheath (20) has a positioning slot (20e) on only one side, so that its structure is sturdier than that of the guiding sheath (20) of the first embodiment, and less likely of it or its spacer being flattened or deformed, an improvement over the first embodiment in which the guiding sheath's structure is weakened and thus less able to withstand external pressure due to the opening of a guiding slot cutting across its center. Further, as no elongated bore needed to be drilled in the hinge box (80) to form a guiding slot, the cost of production is reduced. And as the eye-glasses temples (50) and the hinge boxes (80) can be separately manufactured, the hinge assembly can be standardized and mass produced, and then fitted with various combinations of temples (50) and lens frames (90) to achieve a variety of fashionable eye-glasses frames.

After a thorough discussion of the preferred embodiment, those skilled in the an can make modification without departing from the spirit and scope of the claims, nor is the present invention limited to the instance of embodiment herein described.

The guiding sheath of the present invention has sturdier structure, can prolong hinge's durability and lower the cost of producing the components for the hinge assembly of the titanium alloy eye-glasses frames.

What is claimed is:

1. A guiding sheath assembly comprising:

a guiding sheath comprising a cylinder, the cylinder comprising a center aperture at a first end thereof and a blind guiding slot extending from the center aperture towards a second end of the cylinder opposite the first end of the cylinder, the guiding slot formed along an outer wall of the cylinder and connected to the center aperture, a spacer is secured at the first end of the cylinder around the center aperture, the cylinder includes a neck ditch;

an active core comprising a head portion, a core shaft extending from the head portion, and a positioning back attached to the core shaft and the head portion, the head portion is adapted to be hinged to a hinge of an eyeglass frame, the core shaft is secured in the center aperture such that the positioning back of the active core slides in the guiding slot of the cylinder, with a portion of the active core extending outside of the center aperture;

a spring is positioned around the core shaft between the cylinder and a stopper at an open end of the core shaft; and a housing encases the spring, the core shaft and the head portion, the housing is secured to the spacer, such that the core shaft is movable under tension of the spring, a cave point is formed at the housing to indent toward the neck ditch of the cylinder in order to movably retain the cylinder inside the housing, such that when the head portion of the active core is secured to a main hinge and rotated, an apex of the main hinge abuts against the spacer causing the active core to extend towards the main hinge, thereby reducing frictional contact between the main hinge and the housing.

2. The guiding sheath assembly as recited in claim 1, wherein the spacer is U-shape and comprises at least two pieces that contact the apex of the main hinge when the housing is rotated from the main hinge.

3. The guiding sheath assembly as in claim 1 or 2, wherein the guiding sheath comprises material selected from the group consisting of metal alloy, stainless steel and synthetic rubber.

\* \* \* \* \*